United States Patent [19]
Lewine

[11] Patent Number: 5,668,917
[45] Date of Patent: Sep. 16, 1997

[54] APPARATUS AND METHOD FOR DETECTION OF UNWANTED BROADCAST INFORMATION

[76] Inventor: Donald A. Lewine, 40 Maclean Dr., Sudbury, Mass. 01776

[21] Appl. No.: 581,183

[22] Filed: Dec. 29, 1995

Related U.S. Application Data

[63] Continuation of Ser. No. 270,592, Jul. 5, 1994, abandoned.

[51] Int. Cl.$^6$ .................................................. H04N 5/76
[52] U.S. Cl. ........................... 386/52; 348/907; 348/460; 358/908
[58] Field of Search ............................ 358/908, 335; 348/460, 714, 571; 386/52; H04N 5/76, 5/78, 5/782, 5/91, 5/93

[56] References Cited

U.S. PATENT DOCUMENTS

| | | | |
|---|---|---|---|
| 5,253,061 | 10/1993 | Takahama et al. | 348/460 |
| 5,333,091 | 7/1994 | Iggulden et al. | 360/14.1 |
| 5,343,251 | 8/1994 | Nafeh | 348/571 |
| 5,488,425 | 1/1996 | Grimes | 348/714 |

FOREIGN PATENT DOCUMENTS

| | | | |
|---|---|---|---|
| 0034685 | 2/1991 | Japan . | |
| 0328970 | 11/1992 | Japan | H04N 5/44 |
| 0322581 | 11/1992 | Japan | 358/908 |
| 0056386 | 3/1993 | Japan | H04N 5/782 |
| 0078259 | 3/1994 | Japan | H04N 5/782 |

OTHER PUBLICATIONS

Daly, James "Ad Nauseam" Electronic Entertainment Jul. 1994.

*Primary Examiner*—David E. Harvey
*Attorney, Agent, or Firm*—Donald Lewine

[57] ABSTRACT

Unwanted information, such as commercials, is typically transmitted from a transmission station many times each day. The repetitive nature of such unwanted information is used by the present apparatus/method to distinguish unwanted information from normal programming.

10 Claims, 7 Drawing Sheets

100
APPARATUS AND METHOD FOR DETECTION OF UNWANTED BROADCAST INFORMATION

CROSS REFERENCES TO RELATED APPLICATIONS

This is a continuation of Ser. No. 08/270,592 (now abandoned) which was subject to a restriction requirement. This application claims an effective filing date of Jul. 5, 1994 and except for the claims, title and abstract is identical to the application filed on that date.

BACKGROUND—FIELD OF INVENTION

This invention relates to the field of recording television programs, specifically automatically eliminating television commercials from the recorded program without requiring the television broadcaster to provide a fade or other special signal to indicate the start and end of commercials.

Another aspect of this inventions relates to starting a recorder when a desired program starts instead of at a pre-programmed time. This aspect allows recording entire shows when the television station is running late due to a sports or news event.

BACKGROUND—DESCRIPTION OF PRIOR ART

One of the main problems with eliminating unwanted video information from a recording is identifying what is wanted and what is unwanted. Previous inventors have used a small number of techniques, none of them completely effective.

In U.S. Pat. No. 4,283,735 to Jagger; David (Aug. 11, 1981) Jagger uses color to detect commercials in a black and white movie. He assumes that most commercials will be in color and thus be eliminated. Today, there are very few black and white movies broadcast so this technique does not have wide appeal.

Another technique is to have the broadcaster transmit code information which identifies the wanted and the unwanted video information. This is the method used in U.S. Pat. No. 4,305,101 to Yarbrough; Charles J., Strachan; Alan F, and Weisman; Jo (Dec. 8, 1981), U.S. Pat. No. 4,520,404 to Von Kohorn; Henry (May 28, 1985), U.S. Pat. No. 4,750,053 to Allen; David W. (Jun. 7, 1988), U.S. Pat. No. 4,974,085 to Campbell; Harry D., Silvers; Kenneth W. and Kim; Chang J. (Nov. 27, 1990). In general, it is not in the broadcaster's interest to identify commercials by transmitting special codes. The broadcaster derives most of his income from commercials. A special code may be used in market research as described in U.S. Pat. No. 4,974,085 to Campbell; Harry D., Silvers; Kenneth W. and Kim; Chang J. (Nov. 27, 1990) or as part of a cable television system, however, most broadcasters will not cooperate with viewers who want to eliminate commercials.

Another method detects the fade, or blank space between the program and the commercial U.S. Pat. No. 4,259,689. to Bonner; Edgar L & Faerber; Nelson A (Mar. 21, 1981) and U.S. Pat. No. 4,314,285 to Bonner; Edgar L. (Feb. 2, 1982) are the first to use "absence of picture information in a video signal for at least a predetermined period of time" to detect commercial. Since most people did not own video recording devices when Bonner filed his patent, he only envisioned turning down the audio during the commercial break. U.S. Pat. No. 4,319,286 to Hanpachern; Aran (Mar. 9, 1992) extends Bonner's teaching to include video tape recorders. Additional refinements are presented in U.S. Pat. No. 4,333, 110 to Faerber; Nelson A. and Bonner; Edgar L. (Jun. 1, 1982), U.S. Pat. No. 4,390,904 to Johnston; Howard R. (Jun. 28, 1983), U.S. Pat. No. 4,430,676 to Johnson; Michael K. (Feb. 7, 1984) and U.S. Pat. No. 4,602,297 to Reese; Morris (Jul. 22, 1986) in U.S. Pat. No. 4,750,052 to Poppy; Dwight J. and Samelson; Quentin B. (Jun. 7, 1988) Poppy teaches that the video recording device may be made to backspace over the unwanted material. All of the pausing and rewinding places a great deal of stress on the mechanical parts of a VCR and the process is slow enough that desired video information may be lost. U.S. Pat. No. 4,752,834 to Koombes; Michael E. (Jun. 21, 1988), U.S. Pat. No. 4,782, 401 to Faerber; Nelson A. (Nov. 1, 1988) and U.S. Pat. No. 5,151,788 to Blum; Dieter W. (Sep. 29, 1992) all teach improved methods of fade detection. However, fade detection is a very unreliable method for eliminating commercials. First, there may be fades and short scenes that are part of the desired video information. Second, modern TV studios can produce video programming with no detectable fades between the desired program and the unwanted material.

One solution is to let the viewer decide when unwanted material is present. U.S. Pat. No. 4,918,531 to Johnson; Gene H. (Apr. 17, 1990) is a system for skipping a fixed time interval when the viewer decides that a commercial is present. U.S. Pat. No. 4,979,047 to Wine; Charles M. (Dec. 18, 1990) describes a timer to remind the viewer to change back to the main program after the viewer switched to another channel to avoid a commercial. U.S. Pat. No. 5,241,428 to Goldwasser; Eric P. (Aug. 31, 1993) describes a device allowing the simultaneous recording and playback of a program. A user can arrange to start recording a few minutes before he start viewing. If there are some commercials, he can fast forward through those recorded portions and catch up to the live broadcast.

The final technique and the one that is closest to the methods described in this disclosure is U.S. Pat. No. 4,750, 213 to Novak; Albert P. (Jun. 7, 1988). Novak uses a digital signature to "recognize" scenes. If a human being has previously classified these scenes as unwanted, they can be automatically rejected. Novak teaches a number of improvements to reduce "the massive amount of data processing which can be required to establish a reasonably reliable signature." Even with the improvements taught by Novak, the amount of data processing is still large. More importantly, a human being is required to manually assign identification codes to every scene. The system described by Novak is not suitable for ordinary consumer use. Digital signatures can also be spoofed by television broadcasters. Changing one frame of a commercial would cause it to have a different digital signature. If "commercial busters" become wide-spread, broadcasters would try to fool them to get their commercials seen.

Nothing in the prior art (patents and publications) suggest using the repetitive nature of commercials and station IDs to identify the unwanted information.

Objects and Advantages

Accordingly, several objects and advantages of my invention are to eliminate commercials and other unwanted material from a recording of a television program without human intervention and even when the broadcasters of television programs are hostile to elimination of commercials. That is, this invention not only does not require the cooperation of broadcasters the invention also resists being fooled by broadcasters who want their commercials to be seen.

All of the prior art required either the cooperation of the broadcasters and/or human intervention. None of the prior art has any robustness in the face of a broadcaster intentionally attempting to defeat it. For example, by being clever about where fades are placed, a broadcaster could fool the device described in U.S. Pat. No. 4,750,052 (Jun. 7, 1988) and cause it to record only the commercials and none of the show.

My invention relies on the most obnoxious aspect of commercials to identify and eliminate them: commercials are repeated. A viewer using this invention will see a commercial at most once. In most cases, the viewer will not even see the commercial once because the invention described here can "learn" commercials while the viewer is not watching television.

In order to bypass the commercial eliminator, the broadcaster would need to make sure that every commercial was substantially different. This effort would be expensive for the broadcaster and so he is unlikely to do it. If broadcasters did make every commercial substantially different that would make television more pleasant for the average person and be a general service to humanity.

The user can also use this invention to "learn" the opening sequence of a television show and use it to start a video recorder.

While this patent is described in terms of eliminating unwanted commercials from video recordings of television, application of these methods to eliminating unwanted material for audio recordings of radio or even detecting updates to weather forecasts broadcast by NOAA weather radio should be obvious.

Still further objects and advantages will become apparent from a consideration of the ensuing description and accompanying drawings.

Figure 1:
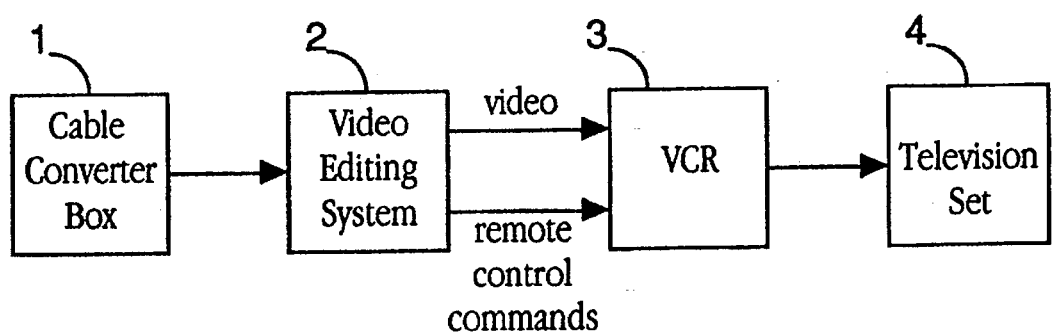
FIG. 1 is a block diagram showing how the video editing apparatus is connected with the user's Television and Video recorder.

REFERENCE NUMERALS 1 cable converter (set top) box
2 video editing system
3 video recorder
4 television set
10 analog to digital converter
20 compression unit
30 image memory
40 decompression unit
50 digital to analog converter
60 control means
60A control means
60B control means
60C control means
70 pattern memory
70A pattern memory
70B pattern memory
70C pattern memory
80 or gate
100 microcomputer bus
110 serial port
120 memory
130 microprocessor
140 TV frame grabber
150 video output card

SUMMARY

This invention prevents the recording or viewing of unwanted video information (commercials, station ids, credits, and so on) by eliminating repeated segments of video information.

PREFERRED EMBODIMENT—DESCRIPTION

There are several ways to build the system disclosed here. I will start by describing the simplest embodiment. I will then describe various improvements that one can make to construct more powerful and less expensive implementations of the invention.

FIG. 1 show how the video editing system 2 is connected to the user's cable converter (set top) box 1, Video recorder 3 and television set 4. The output of the cable converter (set top) box 1 is sent to the video editing system 2. The video editing system 2 passes the video information and remote control commands to the video recorder 3. The output of the video recorder 3 goes to the television set 4. Of course, the video editing system could be included in the set top box or be part of the video recorder 3.

Figure 2:
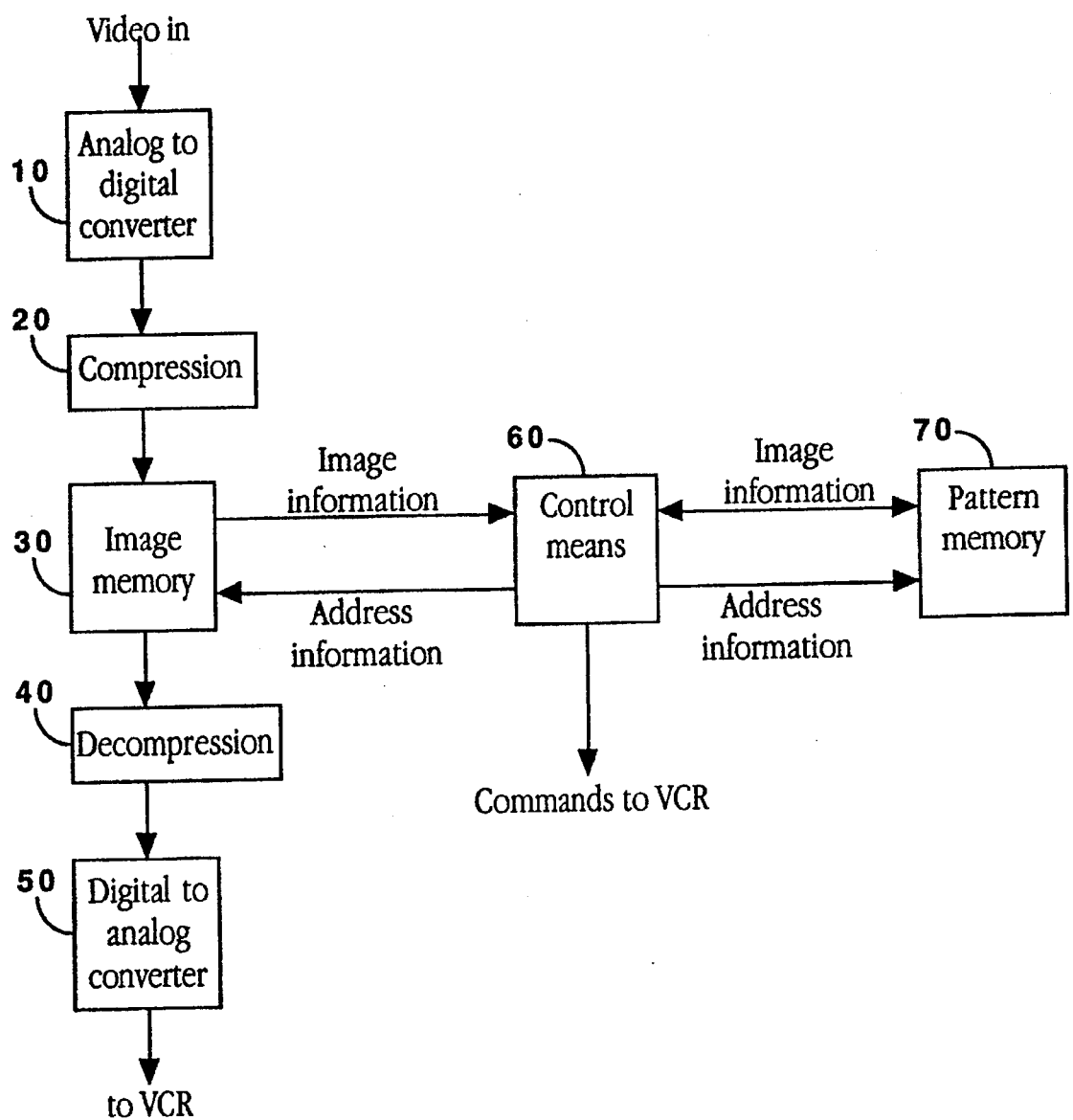
FIG. 2 is a block diagram of the apparatus used in the simplest embodiment.

The first embodiment is shown in FIG. 2. The broadcast video is sent to an analog to digital converter 10. The output of the analog to digital converter is sent to a compression unit 20. The compression unit is not strictly required, however, it reduces the amount of memory needed to store a frame of video. The output of the compression unit is stored in random access memory (RAM). I call this RAM the image memory 30. The memory address at which the frame is stored is provided by the control means 60. I envision that a microprocessor would be used as the control means, however, the control functions are not complex and discrete logic or a gate array could be used. Frames are read out of the image memory 30 using an address supplied by control means 60. The frame is then sent to the decompression unit 40 where is expanded into a full image. The image is then sent to a digital to analog converter 50 where it is converted back to a form where it can be fed to a video recorder 3.

If, at some future point in time, television programs are broadcast in a compressed digital format then the analog to digital converter 10, compression unit 20, decompression unit 40, and digital to analog converter 50 would no longer be required.

The control means 60 is also connected to an additional random access memory used to store the unwanted video information. I call this memory the pattern memory 70. The control means 60 can read and write information into and out of the pattern memory 70. The control means 60 can also compare information stored in the pattern memory 70 with information stored in the image memory 30. The control means 60 can also compare one location in the image memory 30 with another location in the image memory 30.

The control means 60 also generates a pause signal that is sent to the video recorder 3 to briefly stop the tape while the incoming video is being recorded.

Figure 5:
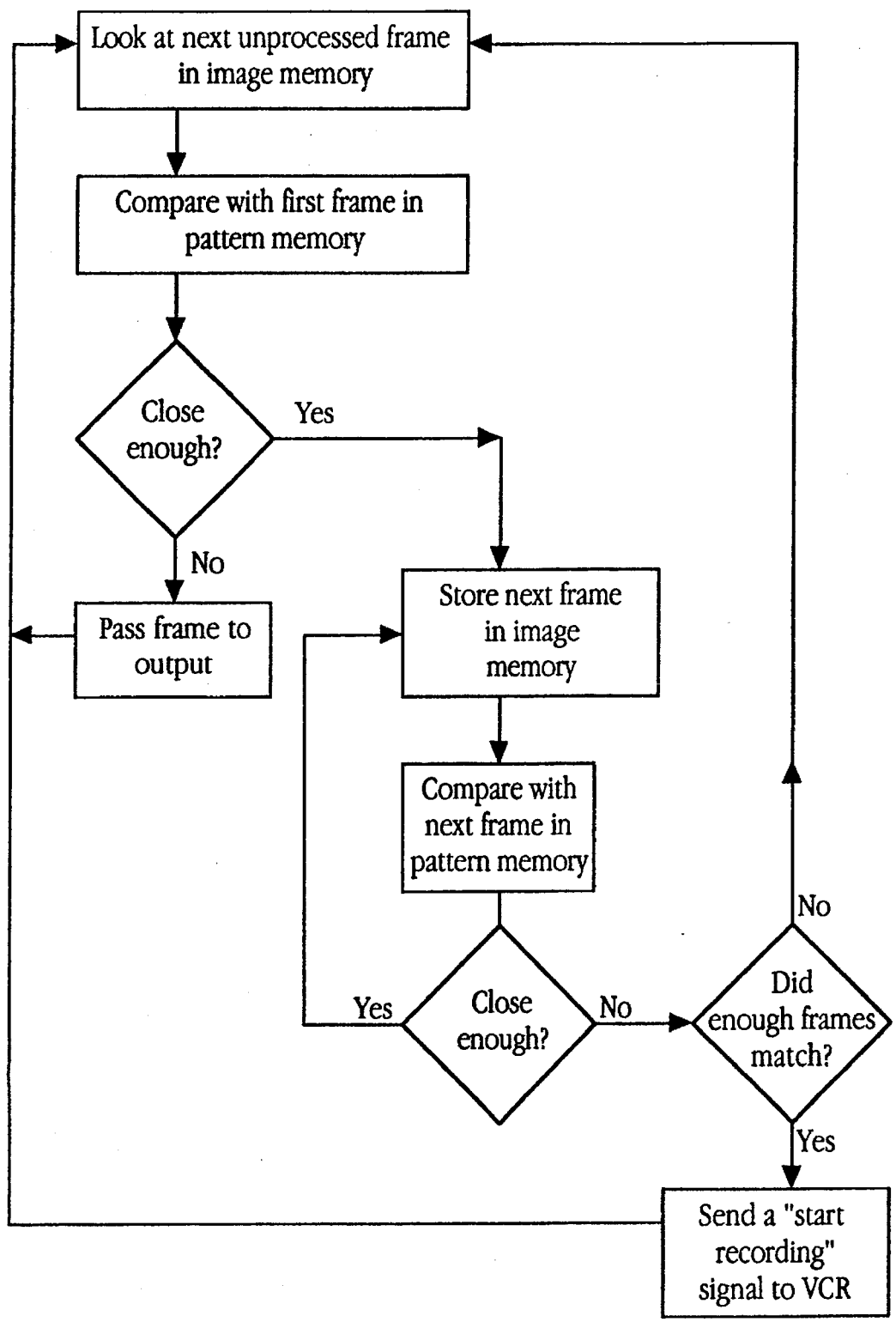
FIG. 5 is a flow chart of the method used to start recording when a desired program starts.

FIG. 5 shows an embodiment which detects multiple commercials. Control means 60A, control means 60B, and control means 60C have the same structure as control means 60 and are used to look for multiple commercials in parallel. Similarly, pattern memory 70A, pattern memory 70B, and pattern memory 70C have the same structure as pattern memory 70 and are use to store multiple patterns. An or gate 80 is used to combine the pause signals from the multiple control means into a single pause signal which is sent to the video recorder 3 when any of the control means (60, 60A, 60B, 60C) detect an unwanted segment of video.

PREFERRED EMBODIMENT—OPERATION

If the system is not editing out commercials, the operation is very simple. Video arrives at the analog to digital converter 10 and is converted to binary (ones and zeros). The binary is sent to the compression unit 20 where is transformed to require fewer bits to store. There are many well known compression algorithms and several vendors make single chip video compression units. Any of these units are suitable for use as compression unit 20. The video information is stored in image memory 30 at an address determined by the control means 60. The video information is then read out of that same address and sent to the decompression unit 40 and the digital to analog converter 50 where the video is sent on the video recorder 3 or television set 4. The control means 60 increments the address for the image memory 30 so that the image memory 30 is fills up with video information.

Depending on the size of the image memory 30 anywhere from a few seconds to several days worth of video may be stored. The larger the memory the more effective the elimination of unwanted information. When enough video has been stored the control means 60 performs the search process shown in FIG. 3. The control means 60 continues passing real-time video through the image memory 30 while it performs this process. The control means 60 must be fast enough to do the required data processing in the time between frames.

The process used to detect repeated video sequences is straightforward. The control means 60 set a pointer to point to the first frame of saved video. The control means 60 then scans the rest of the image memory 30 looking for a matching frame.

When a matching frame is found, the control means 60 continues to see if additional sequential frames match. If enough frames match, control means 60 assumes that it has detected a commercial and saves the matching video information in the pattern memory 70.

The comparisons do not check for an exact match but one which is close enough. If the comparison required that every pixel of every frame matched exactly, the system would fail due to random noise and could be fooled by commercials that were very slightly altered. Instead of an exact comparison this process compares pixels and determines if they are close in hue and brightness. If a large percentage of pixels are close, the two frames are declared equal. If a large percentage of frames in the sequence are equal the sequences are declared to be "close enough." The comparisons are thus robust in the face of noise intentional spoofing. The user of the video editing system 2 can set the parameters that determine how similar the pixels must be, what percentage of pixels must meet that criteria and what percentage of frames must have enough similar pixels.

Figure 4:
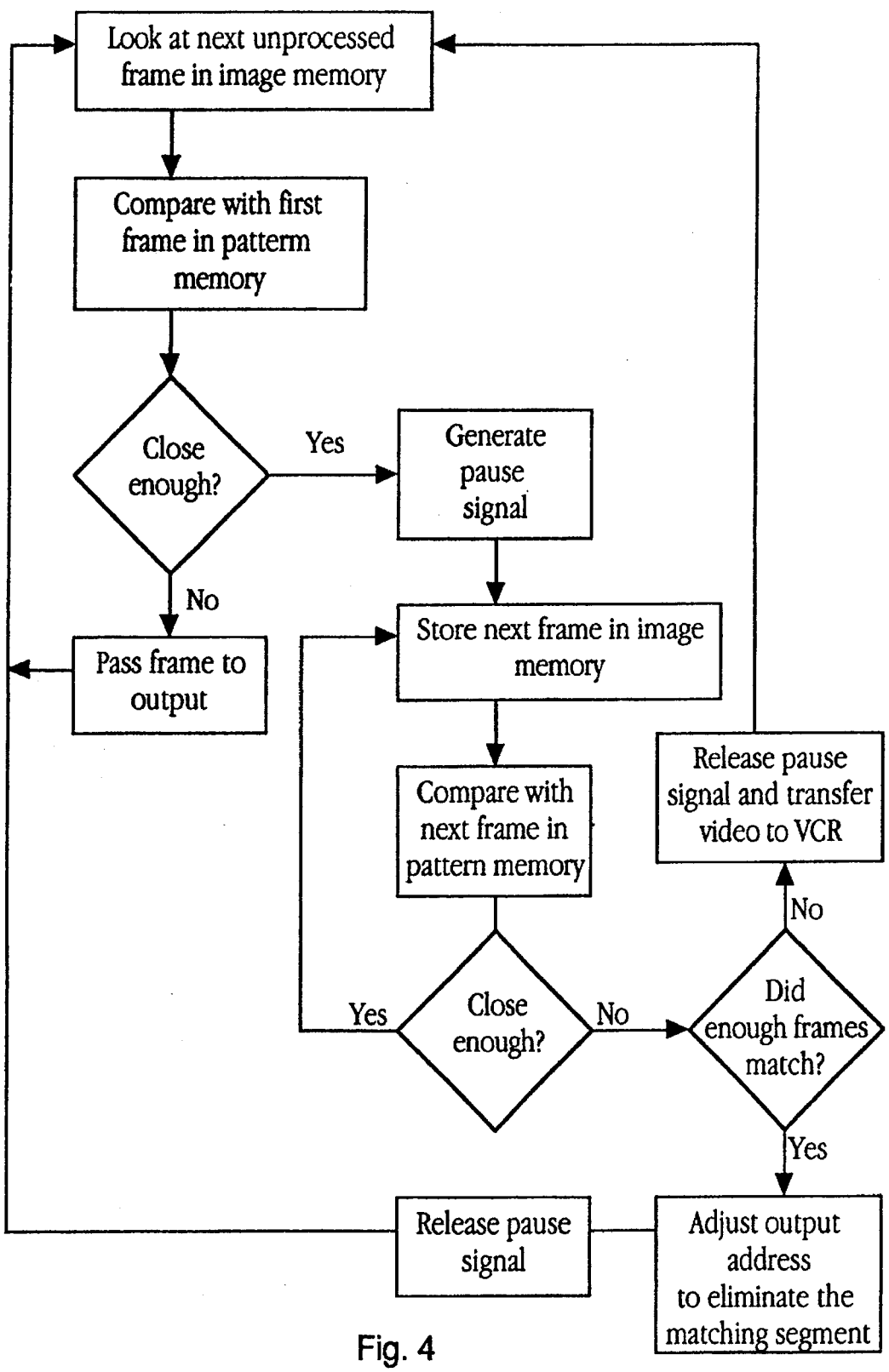
FIG. 4 is a flow chart of the method used to eliminate unwanted video information after it has been detected.

After the control means 60 has stored unwanted video information in the pattern memory 70, the control means 60 performs the commercial elimination process shown in FIG. 4. The control means 60 compares the next unprocessed frame in the image memory 30 with the first frame in the pattern memory 70. If they are not "close enough", the frame is passed to the decompression unit 40, the digital to analog converter 50 and on to the VCR and the process is repeated.

If the frames are "close enough" the pause signal is sent to the VCR and the video information is left in the image memory 30. The incoming video information is then both stored in the image memory 30 and compared to the saved information in the pattern memory 70.

After several frames do not match, the control means 60 decides if enough frames have matched to declare the sequence to be unwanted video information. If the information is to be deleted, the output address used for reading the image memory 30 is adjusted to be just after the commercial and the VCR is continued. If the sequence of frames was not close enough the VCR is continued and the saved information in the image memory 30 is sent to the VCR via the decompression unit 40 and the digital to analog converter 50. Again, the exact values for "several" and "enough" can be set by the user of the video editing system 2.

The addresses generated by the control means 60 to store data in the image memory 30 are allowed to wrap from their maximum value back to zero. That is, they work like a car odometer going from 9999 to 0000. Since data is removed from the image memory 30 at the same rate it is inserted and the only editing done is deleting unwanted information, the image memory 30 can never overflow.

The apparatus and method described above detects an unwanted video segment because it is broadcast multiple times. Once the duplicated video segment is detected, future occurrences are eliminated.

A simple improvement adds a timer to control means 60 to measure how many unwanted video segments are eliminated per unit of time. If too few segments are being eliminated, the control means 60 shifts from the commercial elimination process shown in FIG. 4 back to the search process shown in FIG. 3. That way the most frequently broadcast commercial, station ID, etc. will be eliminated. The user of the video editing system 2 can set the exact parameters.

As described so far, this invention eliminates one unwanted video segment. An improvement is shown in FIG. 5. There are multiple control means (60, 60A, 60B, 60C) and pattern memories (70, 70A, 70B, 70C) which operate in parallel to eliminate multiple commercials at once. The embodiment shown in FIG. 5 scans for four unwanted video segments at once. When any of the unwanted video segments are detected a pause signal is sent to the VCR.

Of course, one could build versions of my invention with even more control means to detect and eliminate more unwanted video segments.

Since the video information is being transmitted at a fixed rate of 30 frames per second and micro electronic devices are such as random access memories (RAM), gate arrays and microprocessors are capable of operating at tens of millions of cycles per second it is straight forward to build the apparatus shown if FIG. 2, but operate the control means 60 four times per frame to simulate the apparatus shown in FIG. 5.

Figure 3:
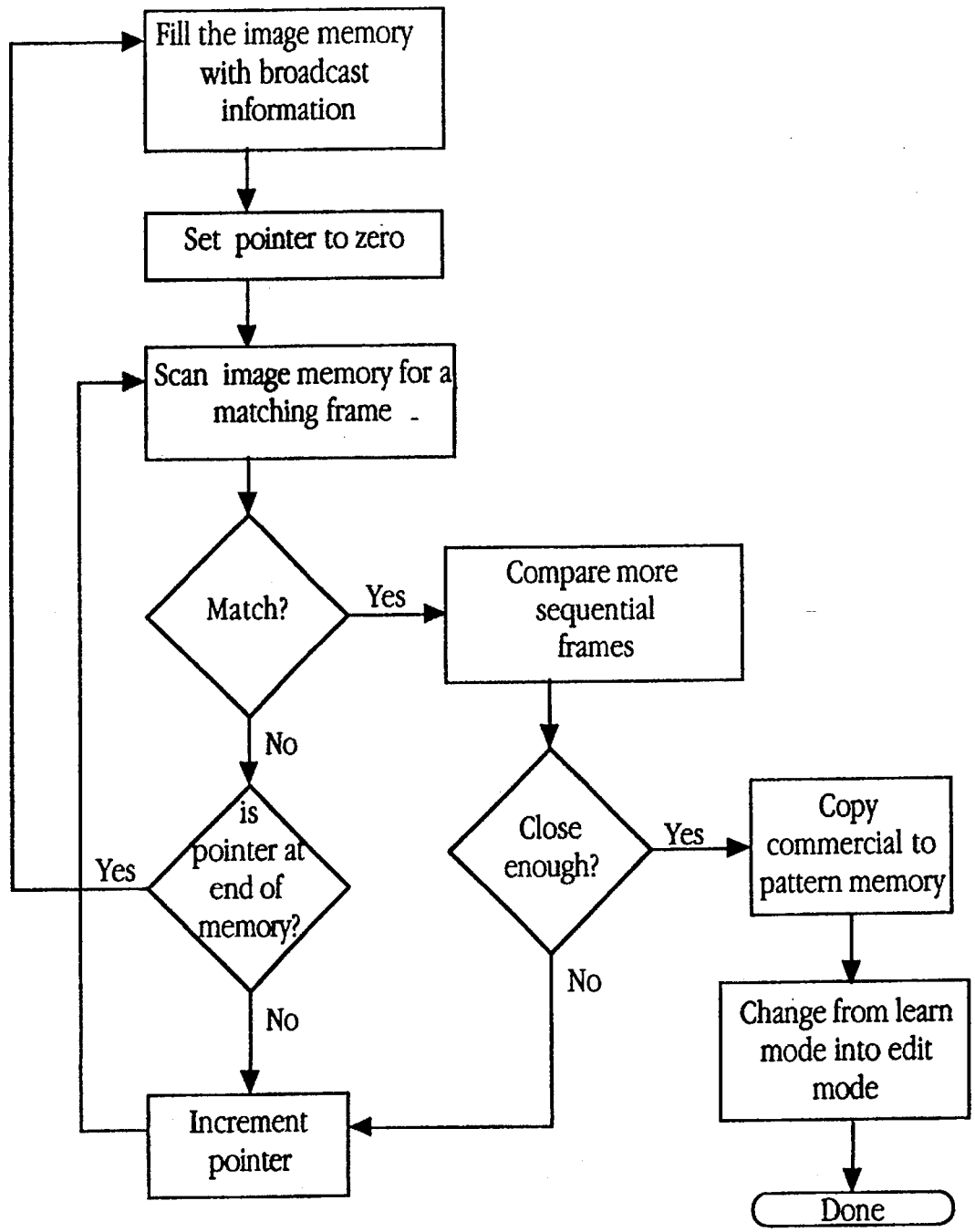
FIG. 3 is a flow chart for the method used to detect unwanted video information.

Given fast enough image memory 30, control means 60 and pattern memory 70, the control means 60 can perform the methods described in FIG. 3 and FIG. 4 many times per frame of video information and thus eliminating a large number of different unwanted video segments in parallel.

An additional improvement combines the image memory 30 with the pattern memory 70 in the same memory devices. Because the memory is addressable, the control means 60 can store both saved patterns and real-time video frames in the same physical memory.

Another use of this invention is to start a video recorder 3 when a particular television program starts. For example, I want to record "60 Minutes" but the start time may be delayed by a variable amount due to a football game. I can store the opening credits for a previous episode of "60 Minutes" in pattern memory 70 and use the control means 60 to detect a match, however, in this case instead of editing out the matching segment the control means 60 merely sends a "start recording" signal to the video recorder 3.

OTHER EMBODIMENTS

Embodiment Using a Personal Computer—Description

Figure 7:
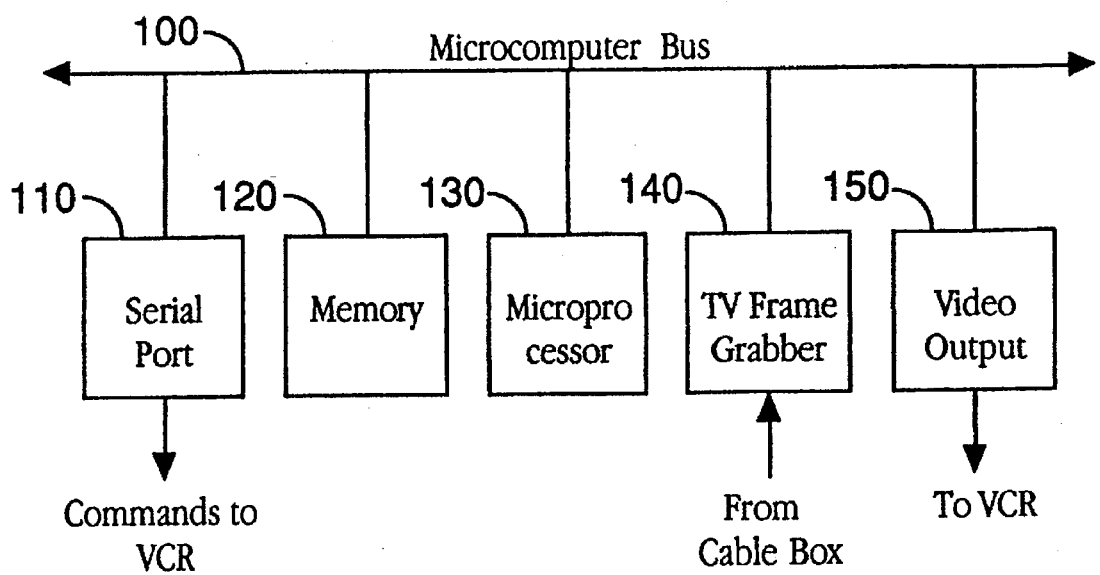
FIG. 7 is a block diagram of an embodiment using a personal computer as the video editing system.

It is possible to implement this invention using ordinary personal computer hardware along with the methods described here. FIG. 7 shows such an embodiment. A microprocessor 130 is used the same way as the control means 60 in FIG. 2. A PowerPC 601 is an example of a microprocessor 130. The video information converted to digital form and stored in memory 120 by the TV frame grabber 140. The VideoVision board for the Apple Macintosh is an example of a TV frame grabber 140. The video is removed from the memory 120 and sent to the VCR 3 by a video output card 150. TV Scan for the Apple Macintosh is an example of a video output card 150. A serial port 110 is used to send remote control signals to the VCR 3. An Apple Macintosh serial port is an example of a serial port 110. These devices are connected together by a microcomputer bus 100. The Apple Macintosh Nu bus is an example of a microcomputer bus 100.

Figure 6:
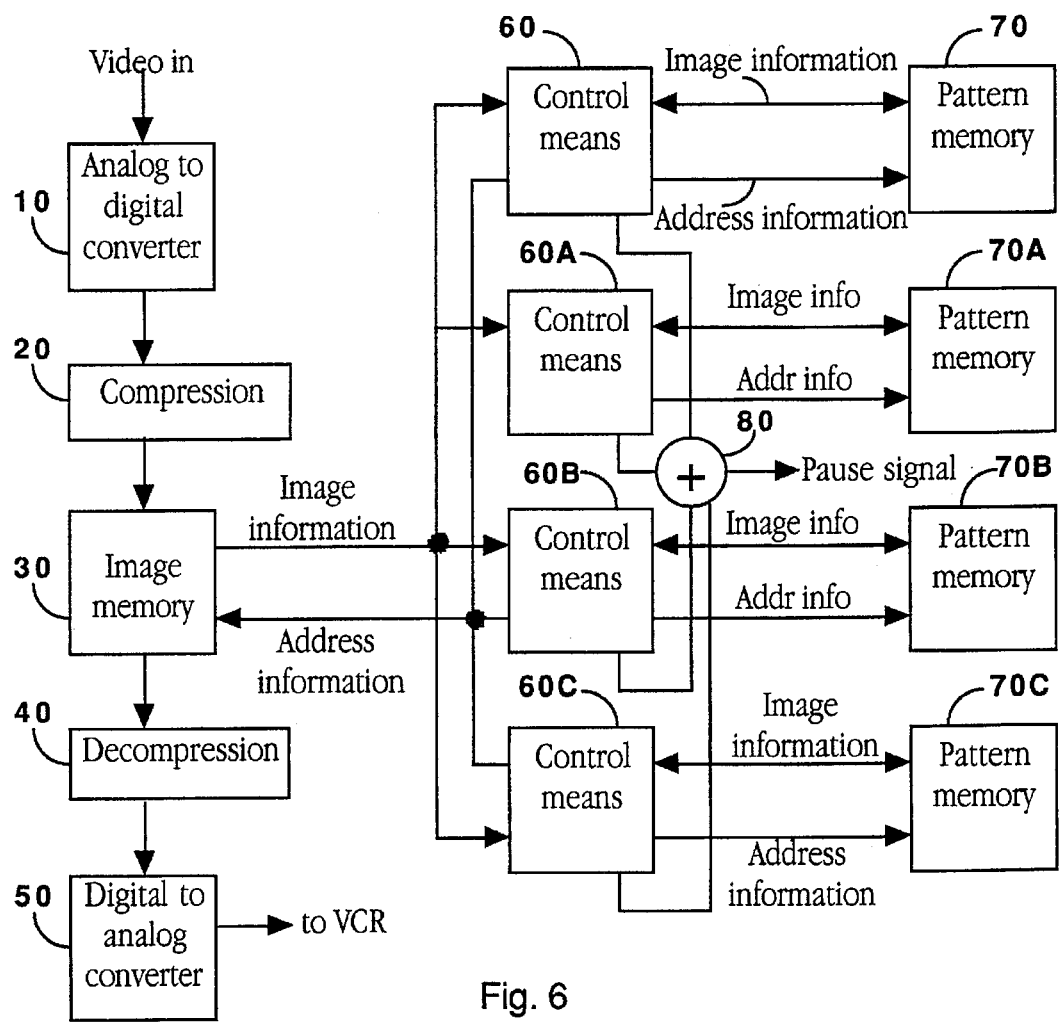
FIG. 6 is a block diagram of the apparatus used to detect multiple commercials.

In this embodiment the functions performed by control means 60, control means 60A, control means 60B, and control means 60C in FIG. 6 are all performed by microprocessor 130. The functions performed by image memory 30, pattern memory 70, pattern memory 70A, pattern memory 70B, and pattern memory 70C shown in FIG. 6 are all performed by memory 120.

Most video recorders 3 have an infrared remote control input rather than an RS-232 port. Converting from RS-232 to infrared in not complex. Such circuits are well known and not novel. A typical circuit uses a LM555 timer to generate a carrier and an MLED930 Infrared Emitting Diode to send data on the light beam. The PC output is then connected to pin 4 of the LM555 using a 1N914 diode. Other circuits may be used.

Embodiment Using a Personal Computer—Operation

The operation in this embodiment is very similar to the embodiment shown in FIG. 6. Software executes the method shown in FIG. 3 in exactly the same way as described above for the preferred embodiment. The method is executed multiple times per frame to simulate the multiple control means and pattern memories shown in FIG. 6.

As duplicated video is detected, microprocessor 130 performs the method shown in FIG. 4 in exactly the same way it is described above for the preferred embodiment. Again the method can be executed multiple times per frame of video to simulate the multiple control means and pattern memories shown in FIG. 6.

CONCLUSIONS, RAMIFICATIONS, AND SCOPE

Accordingly, it can be seen that this invention is a major advance over prior art. While all prior inventions depend on some signal to identify a commercial, this invention uses their most obnoxious characteristic, repetition, to identify and eliminate commercials. Thus, a viewer will see a commercial at most once.

Although the description above contains many specificities, these should not be construed as limiting the scope of the invention but as merely providing illustrations of some of the presently preferred embodiments of this invention. Various other embodiments and ramifications are possible within it's scope. For example, I can imagine a television set or set top box which watches many channels in parallel and learns all of the current commercials. When the viewer wants to record a program, all of these memorized commercials would be eliminated. When watching television in real-time, a music video or other material selected by the viewer could be substituted for the commercial.

If this invention were widely used, repeated material would no longer be broadcast. Instead, sponsors would have to create unique commercials which could only be broadcast once. While sponsors may create unique commercials for the Superbowl or the World Series they are unlikely to do so for ordinary broadcasts.

Thus the scope of the invention should be determined by the appended claims and their legal equivalents, rather than by the examples given.

What is claimed is:

1. In a system for detecting commercials or other repeated information, said system having:
   (1) an image memory for holding frames of information;
   (2) said image memory being addressable and having a first frame and additional sequential frames;
   (3) a pointer for addressing said image memory;
a method for detecting commercials comprising:
   (a) placing frames of information into said image memory;
   (b) setting said pointer to address said first frame in said image memory;
   (c) scanning said image memory for a second frame which matches the frame pointed to by said pointer;
   (d) if no match is found, incrementing said pointer and repeating step (c).

2. The method as recited in claim 1, further comprising:
   (e) if a match is found, comparing additional sequential frames;
   (f) if fewer than a predetermined number of frames match, incrementing said pointer and repeating step (c);
   (g) if greater than or equal to said predetermined number of frames match, performing an action.

3. The method as recited in claim 2, where the action in step (g) is copying the matching frames to a pattern memory.

4. The method as recited in claim 2, where the action in step (g) is marking the matching sequence of frames.

5. The method in as recited in claim 2, where the action in step (g) is saving the starting and ending address of the matching frames.

6. A method for detecting repeated information in a television program comprising:

(a) storing frames of information in an image memory;

(b) setting a pointer to point to a first frame stored in said image memory;

(c) finding a matching frame by comparing frames of information stored in said image memory with the frame pointed to by said pointer;

(d) finding a matching sequence by comparing at least one frame subsequent to said matching frame with at least one frame subsequent the frame pointed to by said pointer.

7. The method as recited in claim 6, further comprising:

(e) remembering said matching sequences as repeated information.

8. The method as recited in claim 7, further comprising:

(f) incrementing said pointer to point to the next sequential frame in said image memory and repeating said matching step (c), said finding step (d) and said remembering step (e).

9. The method as recited in claim 8, further comprising repeating said incrementing step (f) until all repeated information is remembered.

10. The method as recited in claim 6, where the repeated information is a television commercial.

\* \* \* \* \*